US009851740B2

(12) United States Patent
Song et al.

(10) Patent No.: US 9,851,740 B2
(45) Date of Patent: Dec. 26, 2017

(54) SYSTEMS AND METHODS TO PROVIDE REFERENCE VOLTAGE OR CURRENT

(71) Applicant: QUALCOMM Incorporated, San Diego, CA (US)

(72) Inventors: Chao Song, San Diego, CA (US); Kevin Wang, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/250,064

(22) Filed: Aug. 29, 2016

(65) Prior Publication Data

US 2017/0293314 A1 Oct. 12, 2017

Related U.S. Application Data

(60) Provisional application No. 62/358,424, filed on Jul. 5, 2016, provisional application No. 62/320,260, filed on Apr. 8, 2016.

(51) Int. Cl.

| | |
|---|---|
| ***G01F 1/10*** | (2006.01) |
| ***G05F 3/08*** | (2006.01) |
| ***G05F 3/20*** | (2006.01) |
| ***G05F 3/26*** | (2006.01) |

(52) U.S. Cl.
CPC .................................... *G05F 3/267* (2013.01)

(58) Field of Classification Search
CPC ... G05F 3/267; G05F 3/16; G05F 1/10; G05F 1/46
USPC ........................... 327/530–546; 323/312–317
See application file for complete search history.

(56) References Cited

U.S. PATENT DOCUMENTS

| | | | | |
|---|---|---|---|---|
| 4,495,425 A * | 1/1985 | McKenzie | G05F 3/267 | 323/313 |
| 5,945,873 A * | 8/1999 | Antone | G05F 3/265 | 323/313 |
| 5,955,874 A | 9/1999 | Zhou | | |
| 6,060,918 A * | 5/2000 | Tsuchida | H03K 17/223 | 327/143 |
| 6,356,064 B1 * | 3/2002 | Tonda | H03K 17/223 | 323/313 |
| 6,437,614 B1 * | 8/2002 | Chen | H03K 17/145 | 327/143 |
| 6,465,998 B2 * | 10/2002 | Sirito-Olivier | G05F 3/265 | 323/315 |

(Continued)

OTHER PUBLICATIONS

Dey A., et al., "Design of a CMOS Bandgap Reference With Low Temperature Coefficient and High Power Supply Rejection Performance," International Journal of VLSI Design & Communication Systems, Sep. 2011, vol. 2, No. 3, pp. 139-150.

(Continued)

*Primary Examiner* — Brandon S Cole
(74) *Attorney, Agent, or Firm* — Haynes and Boone, LLP

(57) ABSTRACT

A current mirroring circuit including: a first portion having a first resistor and a first transistor, the first transistor having a control terminal coupled to a control terminal of a first diode-connected transistor; and a second portion having a second resistor and a second transistor, the second transistor having a control terminal coupled to a control terminal of a second diode-connected transistor, the first portion being in electrical communication with a first power level and the second portion being in electrical communication with a second power level, the first portion being coupled to the second portion.

28 Claims, 4 Drawing Sheets

(56) References Cited

U.S. PATENT DOCUMENTS

| | | | | |
|---|---|---|---|---|
| 6,927,622 | B2 * | 8/2005 | Rashid | G05F 3/265 323/312 |
| 7,202,730 | B2 * | 4/2007 | Sack | G01R 19/2503 327/538 |
| 7,342,439 | B2 * | 3/2008 | Hsiao | G05F 1/468 327/538 |
| 7,479,821 | B2 * | 1/2009 | Imura | G05F 3/24 257/E27.061 |
| 8,760,143 | B2 | 6/2014 | Satoh | |
| 8,791,685 | B2 | 7/2014 | Cho | |
| 9,218,014 | B2 | 12/2015 | Daigle | |
| 2007/0007934 | A1 | 1/2007 | Imtiaz | |
| 2008/0074173 | A1 * | 3/2008 | Tu | G05F 3/26 327/543 |
| 2009/0051443 | A1 * | 2/2009 | Illegems | H03K 3/011 331/57 |
| 2015/0102856 | A1 | 4/2015 | Barrett, Jr. | |

OTHER PUBLICATIONS

Liu S., et al., "Process and Temperature Performance of a CMOS Beta-Multiplier Voltage Reference", Proceedings Midwest Symposium on Circuits and Systems, Aug. 9, 1998, pp. 33-36.

Azcona C., et al., "A rail-to-rail Differential Quasi-digital Converter for low-power Applications", Analog Integrated Circuits and Signal Processing, Springer New York LLC, US, Jun. 28, 2013 (Jun. 28, 2013), XP035311744, vol. 76, No. 3, pp. 287-295, ISSN: 0925-1030, DOI: 10.1007/S10470-013-0098-7 [retrieved on Jun. 28, 2013].

International Search Report and Written Opinion—PCT/US2017/021864—ISA/EPO—dated May 22, 2017.

Jakhar D., et al., "Design of a Novel Regulated Cascode Current Mirror", IEEE International Conference on Computer, Communication and Control (IC4-2015), IEEE, Sep. 10, 2015 (Sep. 10, 2015), XP032841574, pp. 1-4, DOI: 10.1109/IC4.2015.7375599 [retrieved on Jan. 7, 2016].

* cited by examiner

SYSTEMS AND METHODS TO PROVIDE REFERENCE VOLTAGE OR CURRENT

CROSS REFERENCE TO RELATED APPLICATIONS

The present application claims the benefit of U.S. Provisional Patent Application No. 62/358,424, filed Jul. 5, 2016, and U.S. Provisional Patent Application No. 62/320,260, filed Apr. 8, 2016, the disclosure of which is incorporated by reference herein in its entirety.

TECHNICAL FIELD

This application relates to providing a reference voltage or current and, more specifically, to systems and methods using current mirroring circuits to provide a reference voltage or current.

BACKGROUND

A mobile computing device, such as a smart phone, contains a multi-core chip to provide computing power. Examples of processing cores include a Digital Signal Processor (DSP) core, a Graphics Processing Unit (GPU), a Central Processing Unit (CPU), a modem, and a camera core. Each core may include multiple clocks to capture, store, and transmit digital data at the rising and or falling edges of those clocks.

A clock in a digital processing core may be provided in a number of different ways. One example is to use a crystal that emits a known frequency when exposed to a voltage. Another example is a circuit that is based on a ring oscillator, such as a digitally controlled oscillator. A digitally controlled oscillator may include a power supply that uses a stable reference voltage to provide an output power to the oscillator.

Process, voltage, and temperature (PVT) variation may affect the operation of a digitally controlled oscillator. For instance, slight variance in dimensions of a transistor or doping in a transistor may cause that transistor to be either fast or slow compared to its ideal operation. Similarly, some transistors may behave fast or slow as a result of temperature changes. Also, an operating voltage of the device may affect whether transistors behave fast or slow. A given oscillator may include a multitude of transistors that are each potentially affected by some amount of variation. Accordingly, PVT variation may cause undesired effects in a digital oscillator unless effective compensation is applied.

Additionally, some conventional systems may use a current mirror circuit to provide the reference voltage to the oscillator's power supply. While the current mirror circuit may typically be expected to provide a steady reference voltage or current, some current mirror architectures may be better than others. For example, a beta multiplier may be sensitive to supply voltage variations due to channel length differences in their constituent transistors. An example conventional complementary metal oxide semiconductor (CMOS) bandgap reference employs an amplifier to create a more "ideal" current mirror that is insensitive to supply variation. However, the addition of the amplifier may result in higher power use and larger die area. Furthermore, conventional current mirrors do not generally compensate for PVT variation of transistors in downstream components, such as oscillators.

There is currently a need for a design that is capable of providing a reference voltage or current that is precise and may compensate for variation in the transistors of downstream components.

SUMMARY

Various embodiments include systems and methods that provide a reference voltage or current using a current mirror design that is relatively supply insensitive and may track process and temperature variation of both P-type metal oxide semiconductor (PMOS) and N-type metal oxide semiconductor (NMOS) devices.

In one embodiment, a current mirroring circuit includes: a first portion having a first resistor and a first transistor, the first transistor having a control terminal coupled to a control terminal of a first diode-connected transistor, and a second portion having a second resistor and a second transistor, the second transistor having a control terminal coupled to a control terminal of a second diode-connected transistor, the first portion being in electrical communication with a first power level and the second portion being in electrical communication with a second power level, the first portion being coupled to the second portion.

In another embodiment, a method includes: mirroring a first current and a second current, wherein a path of the first current between a power source and ground includes a first resistor, a first transistor, and a first diode-connected NMOS and PMOS pair, further wherein a path of the second current between the power source and ground includes a second resistor, a second transistor, and a second diode-connected NMOS and PMOS pair, wherein mirroring includes: maintaining a gate of the first transistor and gates of the second diode-connected NMOS and PMOS pair at a same voltage; maintaining a gate of the second transistor and the first diode-connected NMOS and PMOS pair at a same voltage; and outputting a reference voltage from a node disposed between the first transistor and the first diode-connected NMOS and PMOS pair.

In another embodiment, a semiconductor device includes: a first current path between a power source and ground, wherein the first current path includes in series: a first resistor, a first transistor, and a first diode-connected NMOS and PMOS pair, a second current path between the power source and ground, wherein the second current path includes in series: a second resistor, a second transistor, and a second diode-connected NMOS and PMOS pair, wherein a control terminal of the first transistor and a control terminal of the second diode-connected NMOS and PMOS pair are coupled and wherein a control terminal of the second transistor is coupled to a control terminal of the first diode-connected NMOS and PMOS pair, and a reference voltage output terminal in communication with the first current path and disposed between the first transistor and the first diode-connected NMOS and PMOS pair.

In yet another embodiment, a semiconductor device includes: a first portion having first means for providing a nonlinear voltage drop, the first means for providing a nonlinear voltage drop including a first resistor and having a control terminal coupled to a gate terminal of second means for providing a nonlinear voltage drop, the second means for providing a nonlinear voltage drop including a first non-linear device, and a second portion having third means for providing a nonlinear voltage drop, the third means for providing a nonlinear voltage drop including a second resistor and having a control terminal coupled to a gate terminal of fourth means for providing a nonlinear voltage drop, the fourth means for providing a nonlinear drop including a second non-linear device, the first portion being in electrical communication with a power supply and the second portion being in electrical communication with ground, the first portion being coupled to the second portion.

DETAILED DESCRIPTION

Figure 2:
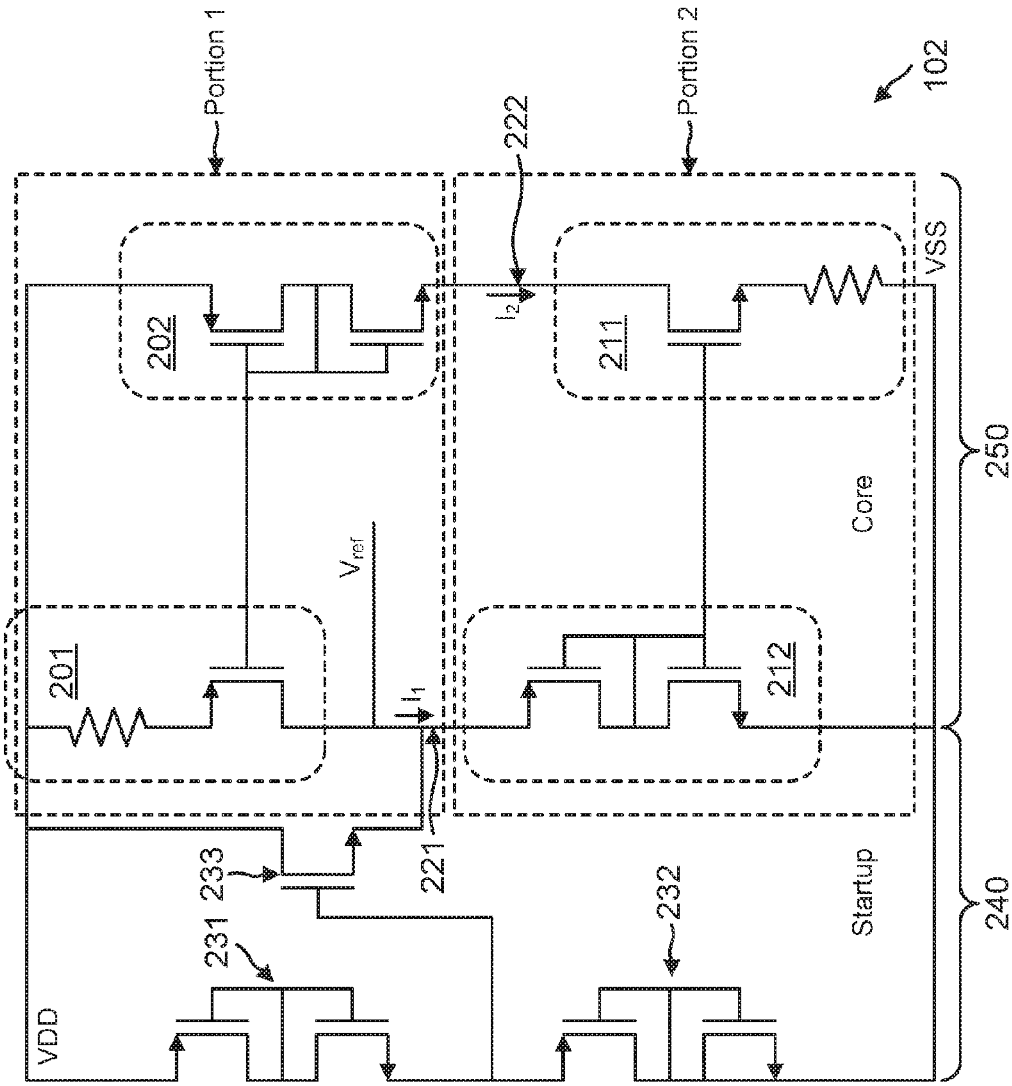
FIG. 2 is a simplified diagram of a reference voltage and current circuit, according to one embodiment.

Various embodiments are directed to circuits and methods to provide a reference voltage or current using a current mirror circuit, exemplified by the circuit of FIG. 2. The circuit includes a symmetric design, instead of a conventional mirror plus amplifier structure, to have a more robust implementation of a current mirror. The simplicity of design results in lower power consumption and smaller die area and reduced complexity than a conventional reference circuit. Furthermore, circuits according to various embodiments may be designed to provide compensation for variation, specifically for process and temperature variation that may be expected to affect the transistors of a downstream oscillator.

For instance, one embodiment includes a circuit having a first current path with a degeneration resistor coupled to the power supply voltage, a first transistor in series with the degeneration resistor, and a first NMOS and PMOS pair coupled to ground and in series with the transistor and degeneration resistor. A second current path exists between the power supply and ground as well. The second current path includes a second NMOS and PMOS pair, a second transistor, and another degeneration resistor in series with the second NMOS and PMOS pair and the second transistor. The second NMOS and PMOS pair are gate coupled with the first transistor, and the first NMOS and PMOS pair are gate coupled with the second transistor. Also, the first and second NMOS and PMOS pairs are diode-connected so as to provide nonlinear voltage drops in their respective current paths.

The degeneration resistors provide linear voltage drops, so that they provide higher voltage drops at higher currents, but the higher voltage drops affect the gate-source voltages at the first and second transistors to reduce current. By contrast, the diode-connected NMOS and PMOS pairs provide nonlinear voltage drops in each of the current paths that complement the gate-source voltage effects at the transistors to which they are gate-coupled.

Continuing with the example, the voltage drops and gate coupling of the circuit result in a current mirroring circuit that has a range of stable operating points. An output voltage node of the current mirroring circuit may be coupled to a startup circuit that biases the voltage output node at a desired operating point and turns off as the circuit reaches the operating point. The example current mirroring circuit provides a stable output voltage or output a current, each of which can be used as a reference.

In some embodiments, the NMOS and PMOS pairs may be assumed to be representative of PMOS and NMOS variation affecting transistors in downstream circuits, such as an oscillator. The reference voltage output node may be disposed in the circuit so that its voltage is equal to a sum of gate-source voltages of one of the PMOS and NMOS pairs. Therefore, process variation causing slow transistors in NMOS or PMOS devices may be expected to incrementally raise the reference output voltage, and process variation causing fast transistors in NMOS or PMOS devices may be expected to incrementally lower the reference output voltage. In other words, the level of the reference output voltage may compensate for some amount of process variation. In embodiments where temperature affects transistors at the current mirror device as well as transistors in the oscillator, the reference output voltage may be expected to compensate for temperature affects as well.

Various embodiments may provide advantages over conventional solutions. For instance, some designs discussed herein may be relatively space-efficient while providing effective process and temperature variation compensation. Furthermore, various embodiments may also provide an acceptably stable output reference voltage over a range of supply voltages and consume less power than conventional amplifier-based current mirrors.

Figure 1:
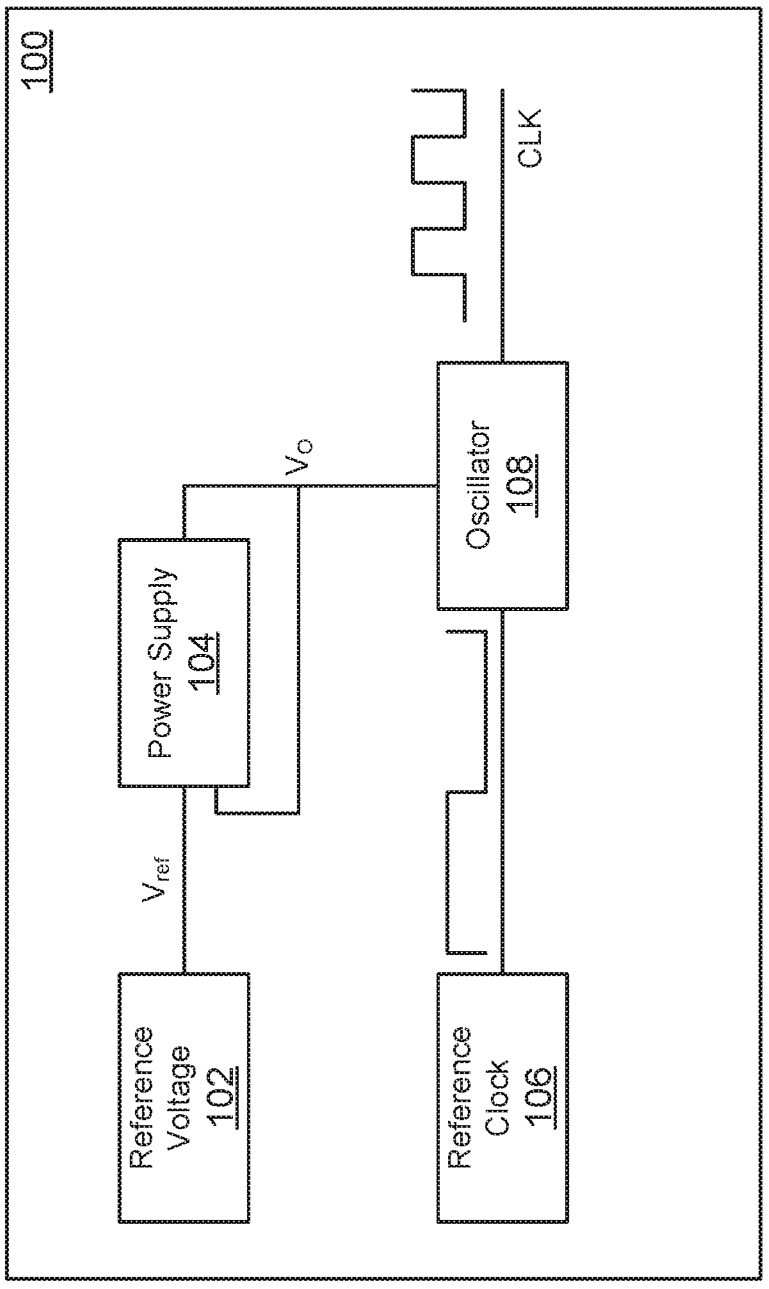
FIG. 1 is a simplified diagram illustrating an example application of a reference voltage or current source, according to one embodiment.

FIG. 1 is a simplified diagram illustrating an example of a semiconductor device according to one embodiment. Device 100 of FIG. 1 in this example is a processing core, such as a central processing unit (CPU) core, a digital signal processing (DSP) core, a modem core, or other core. Device 100 provides an example application of reference voltage circuit 102, and it is understood that the scope of embodiments includes any appropriate application for reference voltage circuit 102. An example of a circuit for use as reference voltage circuit 102 is shown at FIG. 2, and described in more detail further below.

Continuing with the example, a reference voltage circuit 102 produces a reference voltage Vref for power supply 104. Power supply 104 generates power supply voltage $V_0$ corresponding to a level of Vref. Specifically, power supply 104 includes a comparator or other appropriate circuitry to match power supply voltage $V_0$ to Vref, by feeding back the value of $V_0$ to an input of power supply 104. It is assumed in this example that the value of Vref is relatively stable so that power supply 104 provides $V_0$ at a substantially constant value as long as Vref stays at a substantially constant value. An example of a power supply includes a low dropout voltage regulator, which generates a DC voltage from another DC voltage. However, the scope of embodiments may include any appropriate power supply.

Oscillator 108 in this example benefits from a substantially stable power supply voltage, as provided by power supply 104. Oscillator 108 receives the power supply voltage $V_0$ as well as a reference clock signal from reference clock circuit 106. In this example, the reference clock signal includes a lower frequency and longer period than does the output clock CLK. Oscillator 108 may be a digitally controlled oscillator (DCO) or other appropriate oscillator. Examples include a ring oscillator circuit, a crystal-based circuit, or other appropriate circuit to produce the periodic signal CLK. Oscillator 108 provides as an output clock signal CLK, which may be used for a variety of different purposes within device 100, such as capturing bits of data, outputting bits of data, manipulating data, and the like. For example, clock CLK may be used as a clock for flip-flops, latches, and other logic gates at a more detailed level of abstraction within the processing circuitry and/or memory circuitry of device 100.

As noted above, oscillator 108 may include one or transistors that are subject to temperature and process variation. The voltage/current relationship of a given transistor depends on its threshold voltage $V_T$. The threshold voltage $V_T$ is affected by process and temperature variation. A "fast" transistor has a lower $V_T$, and a "slower" transistor has a higher $V_T$. Generally, as temperature of a device increases, $V_T$ decreases. Additionally, variation in the width or length of a feature of the transistor and variation in doping concentrations in different regions of a transistor may affect $V_T$ of that transistor.

If oscillator 108 is fabricated using a complementary process, such as CMOS, it may include PMOS transistors and NMOS transistors, both of which are subject to different kinds of process variation. In some instances, variation affecting NMOS devices may be assumed to be uncorrelated to any variation affecting PMOS devices, and vice versa. However, a given PMOS device or given NMOS device in oscillator 108 may be assumed to have similar process and temperature variation characteristics as a given PMOS device or given NMOS device (respectively) at reference voltage circuit 102.

As explained further below, reference voltage circuit 102 is designed to provide a stable Vref and is also designed to provide some amount of variation compensation for devices in oscillator 108.

FIG. 2 is a simplified diagram of a reference voltage circuit 102, adapted according to one embodiment. Voltage circuit 102 may be used to produce a reference voltage Vref in the device 100 FIG. 1 or may be used in other systems in which a stable reference voltage is desired.

The circuit of FIG. 1 has a startup section 240 and a core section 250. The startup section 240 injects current into the node 221 during circuit startup to bring the core section 250 to a steady-state operating point. The core section 250 produces the reference voltage Vref at node 221. Current I2 mirrors current I1 during operation of circuit 102.

Portion 1 includes a PMOS transistor in series with a resistor, shown as item 201. Portion 1 also includes a diode connected PMOS transistor (top) and a diode connected NMOS transistor (bottom) in series, shown as item 202. Similarly, Portion 2 includes an NMOS transistor in series with a resistor, shown as item 211 and diode connected PMOS (top) and NMOS (bottom) transistors, shown as item 212. The resistors in items 201, 211 are substantially the same value in this example. Furthermore, the transistor in item 201 has a greater drive strength (e.g., is "bigger") than either of the transistors in item 202. Assuming that the drive strength ratio of the transistor of item 201 to a transistor of item 202 is 1/X, then the drive strength ratio of the transistor of item 211 to a transistor of item 212 is also 1/X.

Further in this example, items 201 and 212 are in series with each other, as are items 202 and 211. However, in understanding the circuit of FIG. 2, it may be helpful to think of Portion 1 and Portion 2 separately. Focusing on Portion 2 first, and assuming an increasing voltage at nodes 221 and 222, current I2 would be large at lower voltages because the transistor at item 211 has a relatively high drive strength. But as current I2 increases the voltage drop across the degeneration resistor in item 211 also increases, thereby decreasing the gate-source voltage of the transistor in item 211, which acts as feedback to eventually reduce the current I2. However, as the voltage across the diodes in item 212 increases the current I1 increases in a nonlinear manner and quickly.

Figure 3:
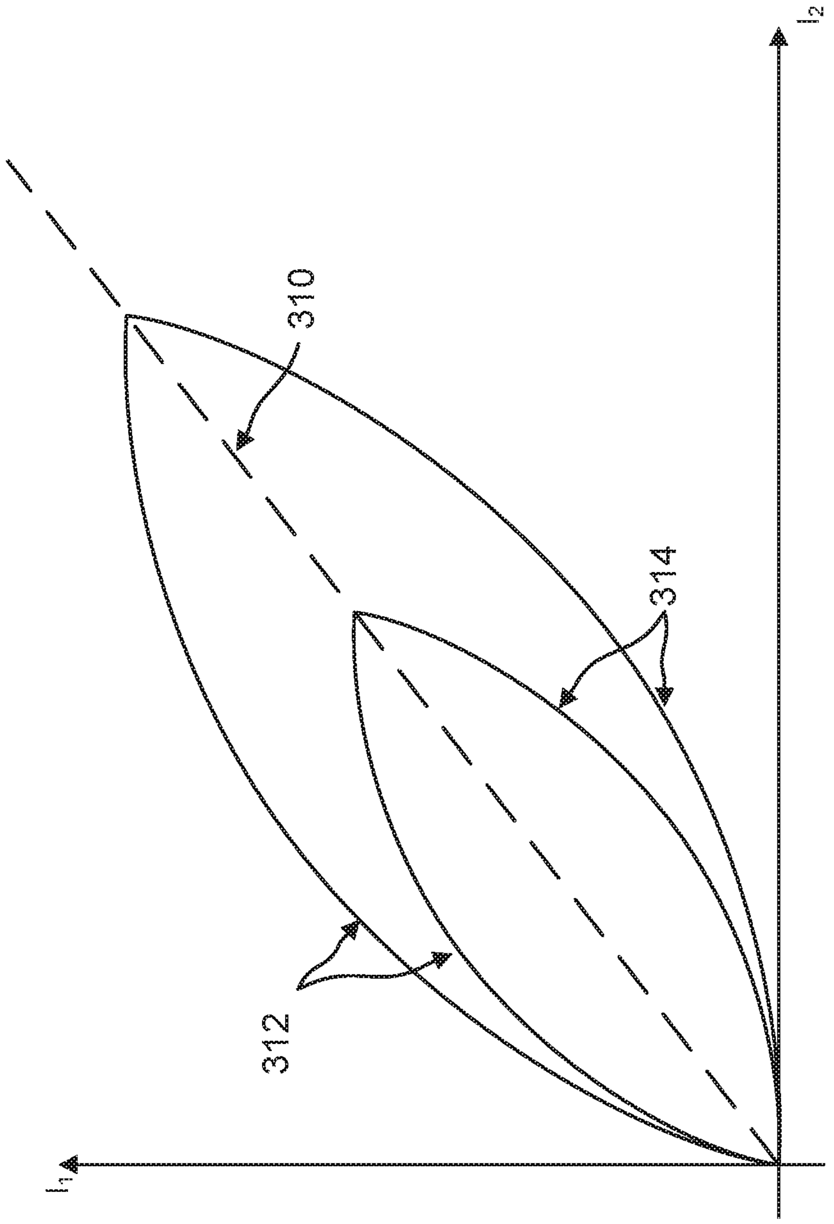
FIG. 3 is an illustration of an example current mirroring relationships of the circuit of FIG. 2, according to one embodiment.

In other words, for the circuit of Portion 2, current I2 would start out larger than current I1, but eventually current I1 would increase and current I2 would begin to decrease. If the circuit of Portion 2 was standing alone, its operation would result in curves similar to the curves 314 in FIG. 3.

Focus now shifts to Portion 1 separately, assuming a fixed VDD and sweeping the voltage at nodes 221 and 222. Item 201 behaves similarly to item 211, and item 202 behaves similarly to item 212 so that the current I1 would start larger than the current I2 at a smaller voltage difference between VDD and nodes 221, 222. But as the voltage difference between VDD and the voltages at nodes 221, 222 increases eventually current I2 would increase and current I1 would begin to decrease, thereby resulting in a curve similar to one of the curves 312 in FIG. 3.

Of course, neither Portion 1 nor Portion 2 exists by itself. Rather, portions 1 and 2 are coupled as shown in FIG. 2 to create one current path for I1 and another current path for I2. An intersection of a curve 312 and a curve 314 represents an operating point of the reference voltage circuit 102 of FIG. 2 at a particular voltage of nodes 221, 222. As the voltage at nodes 221, 222 increases or decreases, the operating point would be placed along the line 310 of FIG. 3. Portion 1 and Portion 2 are stacked so that item 201 and item 212 are in series and have different nonlinear behavior as described above. Similarly, items 202 and 211 are in series and also have different nonlinear behavior. But when arranged as shown in FIG. 2, a robust current mirroring circuit having a behavior shown by line 310 is achieved. Portion 1 is in electrical communication with a first power level VDD and Portion 2 is in electrical communication with a second power level VSS (or ground).

The reference voltage circuit 102 of FIG. 2 includes both PMOS and NMOS transistors and accordingly experiences PVT variation for both PMOS and NMOS devices. NMOS variation that tends to result in slow NMOS devices will result in an incremental rise in the value of Vref, and NMOS variation that tends to result in fast NMOS devices will result in an incremental decrease in the value of Vref. The same is true for PMOS variation as well. Thus, cumulative effects of variation for PMOS and NMOS devices influence the value of Vref. This incremental increase or decrease in Vref offsets the effects of PMOS and NMOS variation in the digitally controlled oscillator circuit 108 of FIG. 1. For instance, a slower transistor in a ring oscillator within oscillator circuit 108 may be compensated by a higher $V_0$, and a faster transistor in a ring oscillator may be compensated by a lower $V_0$. Since $V_0$ corresponds to Vref in device 100 of FIG. 1, the level of Vref may compensate for process and temperature variation in the transistors of oscillator 108.

The influence of process and temperature variation upon the reference voltage Vref is apparent from the architecture of reference voltage circuit 102. Specifically, the value of Vref at node 221 is equal to the sum of the gate-source voltages (Vgs) of the NMOS and PMOS pair at item 212. Therefore, an increase in a threshold voltage of either of the transistors in item 212 would result in an increase of Vref. Similarly a decrease in a threshold voltage of either of the transistors in item 212 would result in a decrease of Vref.

The embodiment of FIG. 2 includes both NMOS and PMOS devices in order to compensate for process or temperature variation that might affect NMOS or PMOS devices in downstream devices, such as an oscillator. In other words, assuming that some process variation for NMOS may be uncorrelated with process variation for PMOS and vice versa, the inclusion of both PMOS and NMOS in the architecture of FIG. 2 provides for a Vref that takes into account the different effects of variation, despite any lack of correlation.

Furthermore, the scope of embodiments is not limited to CMOS devices only. Rather, other embodiments may include transistors using bipolar technology, gallium arsenide technology, or other technology now known or later developed. However, and as explained above, CMOS devices may benefit from the architecture of FIG. 2 because process and temperature variation affecting both PMOS and NMOS may be compensated.

Moreover, the architecture of FIG. 2 is relatively simple yet has robust operation over a range of supply voltages. The core section 250 exhibits a point reflection type of symmetry, which is similar to a mirror image and includes a left-right shift and can also be characterized as a 180° rotation around a point located between nodes 221 and 222. For instance, items 211 and 201 are mirror images shifted from left to right, as are items 212 and 202.

The resistors in items 201 and 211 may be selected to be an appropriate size, depending on acceptable ranges for current level. The resistors may be fabricated using any appropriate technology, such as use of metal wires, polysilicon structures, transistor devices configured to act as resistive devices, and the like. Various embodiments may include resistors with values chosen to provide desired current levels.

Reference voltage circuit 102 further includes startup section 240. Startup section 240 includes a diode-connected NMOS and PMOS pair 231 and another diode-connected NMOS and PMOS pair 232. In contrast to the NMOS and PMOS pairs in core section 250, the NMOS and PMOS pairs 231, 232 are not gate-coupled to other transistors. NMOS and PMOS pairs 231, 232 in this example form a voltage divider generating a voltage that is coupled to the control terminal (gate) of transistor 233. The source of transistor 233 is coupled to node 221. Startup section 240 injects current during circuit startup at node 221 to bring the core section 250 to its operating point. The values of the transistors within startup section 240 may be selected so that when the core section 250 is at its desired operating point, the gate source voltage (Vgs) of transistor 233 causes transistor 233 to turn off.

Figure 4:
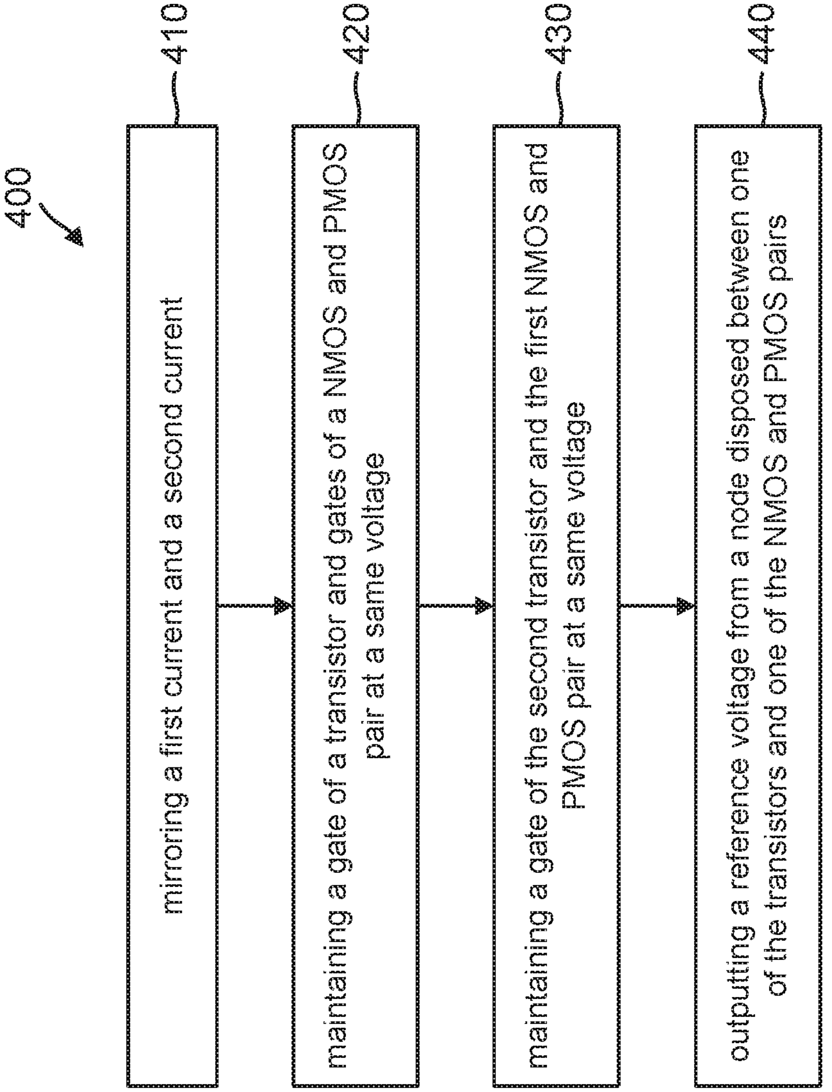
FIG. 4 is an illustration of a flow diagram of an example method of providing a reference voltage or current, according to one embodiment.

FIG. 4 is a flow diagram of an example method 400 according to one embodiment. Method 400 may be performed by an example reference voltage circuit, such as reference voltage circuit 102, shown in FIGS. 1 and 2. As noted above, reference voltage circuit 102 includes a first current path for current I1 and a second current path for current I2.

The first current path includes a degeneration resistor and a transistor in series, such as shown in item 201 of FIG. 2. Item 201 produces a non-linear voltage drop due to the gate-source voltage feedback as current increases or decreases. Specifically, as current increases, the linear voltage-current relationship of the resistor increases the voltage across the resistor thereby decreasing the gate-source voltage, so that the relationship between voltage and current is not necessarily linear. The first current path also includes the diode-connected NMOS and PMOS pair, shown as item 212 in FIG. 2. The diode-connected NMOS and PMOS pair produces a nonlinear voltage drop that is also attributable to its gate-source voltages, although its behavior is different than that of the resistor and transistor of item 201, as explained above.

The second current path includes a diode-connected NMOS and PMOS pair, shown as item 202 of FIG. 2, and its behavior is similar to that of the diode-connected NMOS and PMOS pair and the first current path. Additionally, the transistor coupled with a degeneration resistor behaves similarly to the transistor and degeneration resistor of the first current path.

The circuit of FIG. 2 acts as a current mirror, which produces a relatively stable reference voltage Vref, as well as relatively stable I1 and I2. The current mirror circuit of FIG. 2 can be thought of as a circuit that includes two non-ideal current mirrors (Portion 1 and Portion 2) that are stacked and collectively provide the linear I1-I2 relationship shown by curve 310 of FIG. 3.

At action 410, the current mirroring circuit mirrors a first current and a second current and produces a reference voltage. For instance, in the example of FIG. 2, currents I1 and I2 are mirrored by the circuit 102. Vref is provided at the reference voltage terminal at node 221. The other actions 420-440 are actions that occur within the current mirroring circuit as part of action 410 and are understood not to be serialized actions, but rather occur simultaneously during steady-state operation of the circuit 102.

At action 420, the circuit maintains a gate of a transistor and gates of an NMOS and PMOS pair at a same voltage. For instance, as shown in FIG. 2 the gate of the transistor at item 201 is coupled to the gate of the NMOS and PMOS pair of item 202.

At action 430, the circuit maintains the gate of another transistor and gates of another NMOS and PMOS pair at a same voltage. For instance, as shown in FIG. 2 the gate of the transistor in item 211 is coupled to the gates of the transistors in the NMOS and PMOS pair of item 212.

At action 440, the circuit outputs a reference voltage from a node disposed between one of the transistors and one of the NMOS and PMOS pairs. In the example of FIG. 2, the reference voltage Vref output terminal is at node 221. The NMOS and PMOS pair of item 212 is disposed between node 221 and VSS. Therefore, the level of Vref includes a sum of the gate-source voltages of the NMOS and PMOS pair of item 212.

Various embodiments may include one or more advantages over conventional processes. At action 440, the value of Vref takes into account process and temperature variation that would affect the threshold voltages of the NMOS and PMOS pair coupled to the Vref output terminal. Process and temperature variation that would be expected to result in a relatively slow transistor would result in a higher Vref, and variation that would be expected to result in a relatively fast transistor would result in a lower Vref. The value of Vref in the circuit 102 accounts for NMOS and PMOS variation courtesy of the NMOS and PMOS transistors at item 212. A downstream circuit, such as a power supply that receives Vref, may then output a power supply voltage that corresponds to a level of Vref, thereby propagating the compensation to a further downstream circuits, such as an oscillator or other circuit. In other words, method 400 may include providing a compensation voltage level from the current mirroring circuit to downstream components.

Nevertheless, various embodiments may differ from that shown in FIG. 2. For instance, an alternative embodiment may include a single diode-connected transistor in each of items 202 and 212 rather than a pair of diode-connected transistors. Such embodiment may not then use its Vref to compensate for both NMOS and PMOS variation, although its compensation may be acceptable in various applications in which either PMOS for NMOS dominates in downstream circuits.

For instance, if a downstream circuit primarily includes NMOS devices, then compensating for NMOS variation only in the value of Vref may provide acceptable performance. Additionally, when it is known beforehand that variation by a particular type of device, such as PMOS devices, is a dominant type of variation in the design, then compensating for PMOS variation only in the value of Vref may provide acceptable performance. The scope of embodiments may also include using two-terminal diodes instead of diode-connected transistors, where appropriate.

Moreover, the current mirroring circuit of FIG. 2 maintains the reference voltage at a given operating point in a stable manner during steady-state operation and can be used across a variety of VDD values. In other words, the current mirroring circuit in FIG. 2 is relatively supply insensitive. And, although various embodiments do not exclude the possibility of use of an amplifier, the design of FIG. 2 omits an amplifier from the circuit 102, thereby conforming to a power-efficient and simple design.

The scope of embodiments is not limited to the specific method shown in FIG. 4. Other embodiments may add, omit, rearrange, or modify one or more actions. For instance, other embodiments may include circuits aiding the node 221 reaching a voltage corresponding to a desired operating point during circuit startup. An example is shown in FIG. 2, where the startup section 240 injects current at node 221 to reach a desired operating point and uses the gate-source voltage feedback at transistor 233 to turn off startup section 240 when the operating point is reached. Various embodiments may include transistors 233 and diode-connected pairs 231, 232 sized to provide a particular biasing voltage at a given value of VDD.

Additionally, the Vref output terminal in the example of FIG. 2 shown at node 221. However, other embodiments may include the Vref terminal at node 222. Furthermore, either one of the mirrored currents I1 or I2 may be used by downstream components, such as a comparator or other circuit that may benefit from application of a known current.

As those of some skills in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A current mirroring circuit comprising:

a first portion having a first resistor and a first transistor, the first transistor having a control terminal coupled to a control terminal of a first diode-connected transistor; and a second portion having a second resistor and a second transistor, the second transistor having a control terminal coupled to a control terminal of a second diode-connected transistor, the first portion being in electrical communication with a first power level and the second portion being in electrical communication with a second power level, the first portion being coupled to the second portion, wherein the first diode-connected transistor is included in a first diode-connected pair of transistors including an NMOS transistor and a PMOS transistor, further wherein the second diode-connected transistor is included in a second diode-connected pair of transistors including an NMOS transistor and a PMOS transistor.

2. The current mirroring circuit of claim 1, further including a reference voltage terminal disposed between the first portion and the second diode-connected pair of transistors.

3. The current mirroring circuit of claim 1, wherein a ratio of a drive strength of the first transistor to a drive strength of the first diode-connected transistor is 1/X, further wherein a ratio of a drive strength of the second transistor to a drive strength of the second diode-connected transistor is 1/X.

4. The current mirroring circuit of claim 1, wherein the first power level corresponds to VDD, and wherein the second power level corresponds to ground or VSS.

5. The current mirroring circuit of claim 1, wherein the current mirroring circuit is disposed on a same semiconductor chip with a digitally controlled oscillator and a power supply of the digitally controlled oscillator, wherein the power supply is configured to generate a power supply voltage corresponding to a reference voltage from the current mirroring circuit, and further wherein the digitally controlled oscillator is configured to receive the power supply voltage.

6. The current mirroring circuit of claim 1, wherein the first resistor and the first transistor are coupled in series with the second diode-connected transistor, further wherein the second resistor and the second transistor are coupled in series with the first diode-connected transistor.

7. The current mirroring circuit of claim 1, wherein the first portion and the second portion are arranged having point reflection symmetry.

8. The current mirroring circuit of claim 1, further comprising a startup circuit having a third transistor, the third transistor having a first terminal coupled with the first power level, a second terminal coupled with the first transistor and the second diode-connected transistor, and a control terminal coupled with a voltage divider.

9. A method comprising:

mirroring a first current and a second current, wherein a path of the first current between a power source and ground includes a first resistor, a first transistor, and a first diode-connected NMOS and PMOS pair, further wherein a path of the second current between the power source and ground includes a second resistor, a second transistor, and a second diode-connected NMOS and PMOS pair, wherein mirroring includes:

maintaining a gate of the first transistor and gates of the second diode-connected NMOS and PMOS pair at a same voltage;

maintaining a gate of the second transistor and the first diode-connected NMOS and PMOS pair at a same voltage; and outputting a reference voltage from a node disposed between the first transistor and the first diode-connected NMOS and PMOS pair.

10. The method of claim 9, wherein the reference voltage is equal to a sum of gate-source voltages of the first diode-connected NMOS and PMOS pair.

11. The method of claim 9, further comprising:

receiving the reference voltage at a power supply; and generating a power supply voltage corresponding to a level of the reference voltage.

12. The method of claim 11, further comprising:

receiving the power supply voltage at a digitally controlled oscillator, wherein the reference voltage comprises a compensation voltage level corresponding to a process or temperature variation affecting devices within the digitally controlled oscillator; and outputting a clock signal from the digitally controlled oscillator.

13. The method of claim 9, further comprising biasing a node disposed between the first transistor and the first diode-connected NMOS and PMOS pair at a voltage corresponding to an operating point of a current mirroring circuit.

14. A semiconductor device comprising:

a first current path between a power source and ground, wherein the first current path includes in series: a first resistor, a first transistor, and a first diode-connected NMOS and PMOS pair;

a second current path between the power source and ground, wherein the second current path includes in series: a second resistor, a second transistor, and a second diode-connected NMOS and PMOS pair, wherein a control terminal of the first transistor and a control terminal of the second diode-connected NMOS and PMOS pair are coupled and wherein a control terminal of the second transistor is coupled to a control terminal of the first diode-connected NMOS and PMOS pair; and a reference voltage output terminal in communication with the first current path and disposed between the first transistor and the first diode-connected NMOS and PMOS pair.

15. The semiconductor device of claim 14, further comprising:

a voltage regulator configured to receive a reference voltage from the reference voltage output terminal and configured to provide an output voltage corresponding to a level of the reference voltage; and a digitally controlled oscillator configured to receive the output voltage as a power supply.

16. The semiconductor device of claim 14, wherein a ratio of a drive strength of the first transistor to a drive strength of a PMOS transistor of the first diode-connected NMOS and PMOS pair is 1/X, further wherein a ratio of a drive strength of the second transistor to a drive strength of an NMOS transistor of the second diode-connected NMOS and PMOS pair is 1/X.

17. The semiconductor device of claim 16, wherein the first transistor includes a PMOS transistor, and wherein the second transistor includes an NMOS transistor.

18. The semiconductor device of claim 14, wherein the first transistor and the second transistor comprise bipolar transistors.

19. The semiconductor device of claim 14, further comprising a startup circuit having a third transistor, the third transistor having a first terminal coupled with the power source, a second terminal coupled to the first transistor and the first diode-connected NMOS and PMOS pair, and a control terminal coupled with a voltage divider.

20. The semiconductor device of claim 14, wherein the first current path and the second current path have point reflection symmetry.

21. The semiconductor device of claim 14, wherein the reference voltage output terminal is configured to provide a reference voltage equal to a voltage drop across the first diode-connected NMOS and PMOS pair.

22. A semiconductor device comprising:

a first portion having first means for providing a nonlinear voltage drop, the first means for providing a nonlinear voltage drop including a first resistor and having a control terminal coupled to a gate terminal of second means for providing a nonlinear voltage drop, the second means for providing a nonlinear voltage drop including a first non-linear device; and a second portion having third means for providing a nonlinear voltage drop, the third means for providing a nonlinear voltage drop including a second resistor and having a control terminal coupled to a gate terminal of fourth means for providing a nonlinear voltage drop, the fourth means for providing a nonlinear voltage drop including a second non-linear device, the first portion being in electrical communication with a power supply and the second portion being in electrical communication with ground, the first portion being coupled to the second portion, wherein the first means for providing a nonlinear voltage drop includes a first transistor in series with the first resistor, wherein the first resistor is disposed between the first transistor and the power supply, and wherein the first non-linear device includes a first diode-connected NMOS and PMOS pair.

23. The semiconductor device of claim 22, wherein the third means for providing a nonlinear voltage drop includes a second transistor in series with the second resistor, wherein the second resistor is disposed between the second transistor and ground;

wherein the second non-linear device includes a second diode-connected NMOS and PMOS pair disposed between the first means for providing a nonlinear voltage drop and ground.

24. The semiconductor device of claim 23, wherein a ratio of a drive strength of the first transistor to a drive strength of a PMOS transistor of the first diode-connected NMOS and PMOS pair is 1/X, further wherein a ratio of a drive strength of the second transistor to a drive strength of an NMOS transistor of the second diode-connected NMOS and PMOS pair is 1/X.

25. The semiconductor device of claim 22, further including a reference voltage terminal disposed between the first portion and the fourth means for providing a nonlinear voltage drop.

26. The semiconductor device of claim 25, wherein the first portion and the second portion are disposed on a same chip with means for producing a clock signal and means for providing an input voltage to the clock signal producing means, wherein the input voltage providing means includes means for generating a power supply voltage corresponding to a reference voltage from the reference voltage terminal.

27. The semiconductor device of claim 22, wherein the first portion and the second portion are arranged having point reflection symmetry.

28. The semiconductor device of claim 22, further comprising startup means for bringing the first portion to an operating point of a current mirroring circuit.

* * * * *